Aug. 16, 1966   R. S. LITTERST   3,266,313

RADIANT ENERGY MEASURING DEVICE AND METHOD

Filed Feb. 7, 1962

INVENTOR.
RALPH S. LITTERST
BY
*Clarence R. Patty Jr.*
ATTORNEY

United States Patent Office 3,266,313
Patented August 16, 1966

3,266,313
RADIANT ENERGY MEASURING DEVICE
AND METHOD
Ralph S. Litterst, Bradford, Pa., assignor to Corning Glass
Works, Corning, N.Y., a corporation of New York
Filed Feb. 7, 1962, Ser. No. 171,646
10 Claims. (Cl. 73—355)

This invention relates to a non-contacting method and apparatus for measuring temperature and more particularly to method and apparatus for measuring temperature of moving material but is in no way limited to such applications.

In the past it has been difficult to measure the temperature of glass tubing or cane while it is being drawn. Methods employing mechanical contact with the drawn material have resulted in causing damage to or otherwise imparting imperfections in, the drawn material surface, while optical methods could scan only a small area of the drawn material thereby limiting the accuracy of the measurements.

It is the specific object of the instant invention to provide apparatus and method for continuously sensing temperature of moving material wherein the temperature sensing element is subjected to radiation from said material through substantially 360°.

Another object of the instnt invention is to provide an accurate and continuous means and method for measuring temperature of moving material without physical contact thereof.

Additional objects, features and advantages of the present invention will become apparent, to those skilled in the art, from the following detailed description and the attached drawing, on which, by way of example, only the preferred embodiments of this invention are illustrated.

I have found such objects can be achieved by forming a hollow cylinder, the cross section of the internal opening in a plane perpendicular to the longitudinal axis of which is an ellipse, the internal surface of which is radiant energy reflective, disposing a temperature sensing element substantially parallel to the longitudinal axis of said cylinder through one focal point of said ellipse and passing the material, whose temperature is to be measured, substantially parallel to the longitudinal axis of said cylinder through the other focal point of said ellipse.

It is known in mathematics that the normal to the tangent at any point on an ellipse bisects the angle between the lines from this point to the foci. It has been found, therefore, that radiant energy emitted from a suitable source positioned at one focal point of an ellipse will be reflected from the ellipse perimeter so as to pass through the second focal point of the ellipse.

Figure 1:
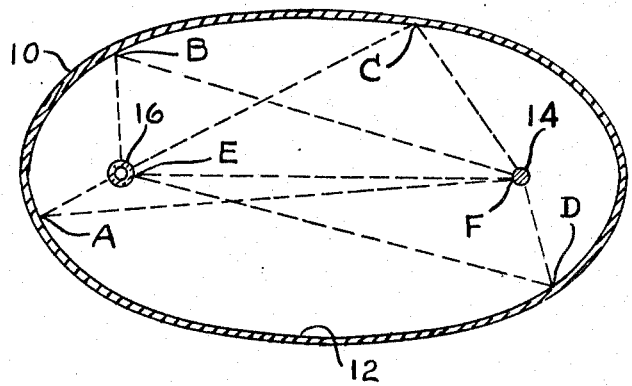
FIG. 1 is a cross sectional view of a temperature sensing apparatus of this invention illustrating the measurement of the temperature of glass tubing on the draw.

FIG. 1 illustrates an elliptical cylinder 10, the inside surface 12, of which is made radiant energy reflective by, for example, polishing, chrome plating, cadmium plating, or the like. Surfaces which have a high luster finish are suitable for the instant purposes. A temperature sensing element 14 is positioned at one focal point of the ellipse formed by the inside surface of cylinder 10. Temperature sensing elements suitable for the instant purposes are, for example, thermocouples, thermisters, resistance wires, and the like. Glass tubing 16, on the draw, is then passed through the cylinder opening at the second focal point of the ellipse formed by the inside surface of cylinder 10. Heat radiated from said glass tubing in substantially any direction in a plane perpendicular to the longitudinal axis of said cylinder is reflected from the inside cylinder surface, such as, for example, from points A, B, C, and D to the temperature sensing element 14. Heat radiated in a direction 180° away from the line E–F between the foci, will of course not be reflected to the sensing element and heat radiated in the direction of line E–F will be sensed by the element directly without being reflected.

Figure 2:
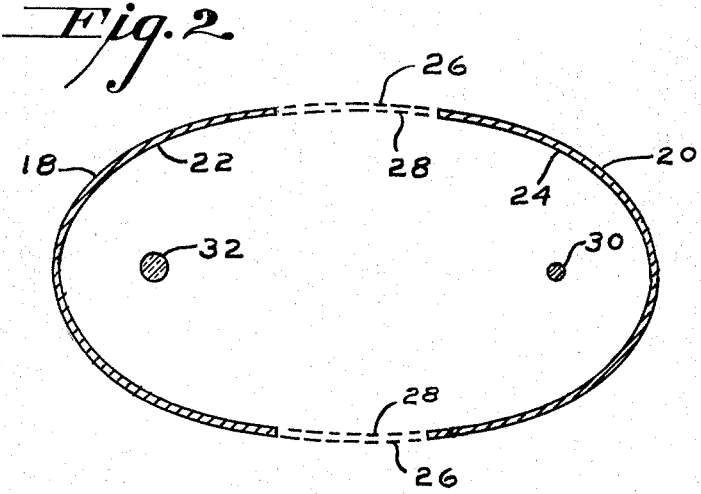
FIG. 2 is a cross sectional view of a temperature sensing apparatus wherein the radiant energy reflector is formed in two parts.

FIG. 2 illustrates another embodiment of this invention. Curved channels 18 and 20 are formed with concave surfaces 22 and 24 respectively, which concave surfaces correspond in shape to that portion of an ellipse which surrounds the ends of the major axis thereof, and said channels are so disposed that an elliptical shape is formed by said concave surfaces 22 and 24, with only that portion missing which substantially corresponds to the minor axis extremities indicated by dotted lines 26 and 28. A temperature sensing element 30 and glass cane 32, are disposed through the respective foci of the ellipse so formed, as hereinabove described. Although some of the radiated energy will be lost through the openings between channels 18 and 20, such losses will not be significant for commercial applications.

The method and apparatus of the instant invention provides economical, accurate, and continuous temperature sensing, without imparting any surface imperfections to the product.

It is obvious that, for example, a temperature sensitive on-off switch, an electrical current regulating device or the like may be substituted for or connected to the temperature sensing element, thereby providing a means for controlling temperature. It is also obvious that the temperature of materials other than glass or of stationary bodies may be measured by the method and apparatus of this invention.

Although the present invention has been described with respect to specific details of certain embodiments thereof, it is not intended that such details be limitations upon the scope of the invention except insofar as set forth in the following claims.

What is claimed is:

1. In an apparatus for measuring temperature of a body through about 360° thereof, a hollow cylinder, the internal opening in a plane perpendicular to the longitudinal axis of which is an ellipse, said cylinder having a radiant energy reflective internal surface, a temperature sensitive element disposed substantially parallel to said longitudinal axis through one focal point of said ellipse, and means for maintaining said body substantially parallel to said longitudinal axis through the other focal point of said ellipse.

2. The apparatus of claim 1 wherein said internal surface is chrome plated.

3. The apparatus of claim 1 wherein said temperature sensitive element is a thermocouple.

4. In an apparatus for measuring temperature of a body through 360° thereof, two curved channels having, in a plane perpendicular to the longitudinal axis thereof, a concave surface corresponding in shape to that portion of an ellipse which surrounds the ends of the major axis thereof and covering a major portion of said ellipse, said channels being so disposed that a substantially elliptical shape is formed by the concave surfaces, said concave surfaces being radiant energy reflective, and a temperature sensitive element disposed substantially parallel to said longitudinal axis through one focal point of the ellipse so formed, and means for positioning said body along the other focus.

5. In an apparatus for sensing temperature of a body through 360° thereof, a hollow cylinder, the internal opening in a plane perpendicular to the longitudinal axis of which is an ellipse, said cylinder having a radiant energy reflective internal surface, a temperature sensing means for sensing the temperature of said body disposed substantially parallel to said longitudinal axis through one focal point of said ellipse, and means for maintaining said body substantially parallel to said longitudinal axis through the other focal point of said ellipse.

6. The method of measuring the temperature of a body through about 360° thereof comprising providing a hollow cylinder the internal opening in a plane perpendicular to the longitudinal axis of which is an ellipse, disposing a temperature sensitive element substantially parallel to said longitudinal axis through one focal point of said ellipse, and thereafter placing said body substantially parallel to said longitudinal axis through the other focal point of said ellipse.

7. The method of measuring the temperature of a material on the draw through about 360° thereof comprising providing a hollow cylinder, the internal opening in a plane perpendicular to the longitudinal axis of which is an ellipse, said cylinder having a radiant energy reflective internal surface, disposing a temperature sensitive element substantially parallel to said longitudinal axis through one focal point of said ellipse, and thereafter drawing said material substantially parallel to said longitudinal axis through the other focal point of said ellipse.

8. The method of claim 7 wherein said internal surface is chrome plated.

9. The method of claim 8 wherein said temperature sensitive element is a thermocouple.

10. An apparatus for measuring the temperature of the material on the draw through about 360° thereof comprising a hollow cylinder, the internal opening in a plane perpendicular to the longitudinal axis of which is an ellipse, said cylinder having a radiant energy reflective internal surface, a temperature sensitive element disposed substantially parallel to said longitudinal axis through one focal point of said ellipse, and means for drawing said material substantially parallel to said longitudinal axis through the other focal point of said ellipse.

References Cited by the Examiner
UNITED STATES PATENTS

| 2,690,078 | 9/1954 | Phillips | 73—355 |
| 2,737,809 | 3/1956 | Fastie | 73—355 |

OTHER REFERENCES

Ciftan, A Ruby Laser With an Elliptic Configuration, in Proceedings of the IRE, vol. 49, No. 5, pages 960–961, TK 5700 17.

Harrison, T. R., Radiation Pyrometry and Its Underlying Principles of Radiant Heat Transfer, New York. John Wiley & Sons, Inc., 1960, pages 110–112, OC 338 H3, copy in group 430.

LOUIS R. PRINCE, *Primary Examiner.*

ISAAC LISANN, *Examiner.*

S. H. BAZERMAN, *Assistant Examiner.*